US008418502B2

(12) United States Patent
Yajima et al.

(10) Patent No.: US 8,418,502 B2
(45) Date of Patent: Apr. 16, 2013

(54) HEATING APPARATUS FOR GLASS-SHEET-FORMING AND A BENDING METHOD FOR A GLASS SHEET

(75) Inventors: Tatsuo Yajima, Tokyo (JP); Akira Sugahara, Tokyo (JP); Hiroshi Yamakawa, Tokyo (JP); Akio Imaichi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 76 days.

(21) Appl. No.: 12/824,997

(22) Filed: Jun. 28, 2010

(65) Prior Publication Data

US 2010/0257900 A1    Oct. 14, 2010

Related U.S. Application Data

(63) Continuation of application No. PCT/JP2008/073834, filed on Dec. 26, 2008.

(30) Foreign Application Priority Data

Dec. 28, 2007    (JP) ................................ 2007-340826

(51) Int. Cl.
*C03B 23/023*    (2006.01)
(52) U.S. Cl.
USPC ........ 65/106; 65/108; 65/64; 65/102; 65/103; 65/286; 65/287; 65/288
(58) Field of Classification Search ............ 65/106, 65/181, 64, 102, 103, 286, 287, 288
See application file for complete search history.

(56) References Cited

U.S. PATENT DOCUMENTS

| 4,687,501 | A | 8/1987 | Reese |
| 5,656,052 | A * | 8/1997 | Boardman et al. ............ 65/103 |

FOREIGN PATENT DOCUMENTS

| DE | 100 47 576 A1 | 4/2002 |
| EP | 0 338 216 | 10/1989 |
| EP | 0 659 697 | 6/1995 |
| JP | 62-265138 | 11/1987 |
| JP | 6-51249 | 7/1994 |
| JP | 2005-343747 | 12/2005 |
| WO | WO 01/23310 A1 | 4/2001 |

* cited by examiner

*Primary Examiner* — Queenie Dehghan
(74) *Attorney, Agent, or Firm* — Oblon, Spivak, McClelland, Maier & Neustadt, L.L.P.

(57) ABSTRACT

The present invention relates to a heating apparatus for glass-sheet-forming, which prevents formation of a heater distortion in a portion of a glass sheet facing to a temperature-distributing heat shield.

A heating apparatus for glass-sheet-forming comprising a heating element for heating a glass sheet, a heat-shielding plate for partitioning a heating region Y into a plurality of regions X and partially shielding radiant heat rays radiated from the heating element toward the glass sheet so as to form a predetermined temperature distribution on a surface of the glass sheet heated by the heating element, wherein the heating apparatus for glass-sheet-forming further comprises an auxiliary heat-shielding plate for partially shielding radiant heat rays radiated from a heating element toward a portion of the surface of the glass sheet, that faces to the heat-shielding plate, as a heat-ray-adjusting means for reducing radiant heat rays from the heating element reaching a portion of the surface of the glass sheet that faces to the temperature-distributing heat shield.

19 Claims, 6 Drawing Sheets

HEATING APPARATUS FOR GLASS-SHEET-FORMING AND A BENDING METHOD FOR A GLASS SHEET

CROSS-REFERENCED TO RELATED APPLICATIONS

This application is a Continuation of PCT/JP2008/073834 filed Dec. 26, 2008. This application is based upon and claims the benefit of priority from Japanese Patent Application No. 2007-340826 filed Dec. 28, 2007, the entire contents of which are incorporated herein by reference.

TECHNICAL FIELD

The present invention relates to a heating apparatus for glass-sheet-forming and a bending method for a glass sheet, in particular, to a heating apparatus for glass-sheet-forming, which is suitable for heating a glass sheet by radiant heat rays from a heating source so as to form a predetermined temperature distribution, and a bending method for a glass sheet which bends a glass sheet after the heating.

BACKGROUND ART

Heretofore, there has been known an apparatus for heating a glass sheet by radiant heat rays from a heating source so as to form a predetermined temperature distribution (for example, refer to Patent Document 1). This apparatus has a heat-shielding plate disposed between a heating source and a glass sheet heated by the heating source so as to be substantially perpendicular to a surface of the glass sheet. This heat-shielding plate shields radiant heat rays that are incident obliquely to the surface of the glass sheet among the radiant heat rays from the heating source. Accordingly, by the above apparatus, it is possible to form a sharp temperature slope in a glass sheet, and to form a desired temperature distribution.

Patent Document 1: JP-A-2005-343747

DISCLOSURE OF THE INVENTION

Problems to be Solved by the Invention

However, in the in the above apparatus described in Patent Document 1, the heat-shielding plate has a function of shielding radiant heat rays that are incident obliquely to a surface of a glass sheet among radiant heat rays from a heating source as described above, but the heat-shielding plate has little function of shielding radiant heat rays that are incident perpendicularly to the surface of the glass sheet. Accordingly, in a heating apparatus having such a heat-shielding plate, a portion of a glass sheet that does not face the heat-shielding plate is irradiated with radiant heat rays incident perpendicularly to the glass sheet, while radiant heat rays incident obliquely to the glass sheet are limited. However, in a portion of the glass sheet facing to the heat-shielding plate, radiant heat rays incident perpendicularly and obliquely from the heating source are not significantly limited, due to the presence of the heat-shielding plate, and the temperature of the portion of a glass sheet facing to the heat-shielding plate becomes higher than the temperature of its surrounding portion, whereby a heater distortion is formed in a boundary portion between them. Particularly, as the distance between the heating source and the glass sheet is reduced to improve the accuracy of temperature distribution of a glass sheet, generation of heater distortion becomes more significant. Accordingly, in the above apparatus of Patent Document 1, the presence of the heat-shielding plate for forming a temperature distribution prevents formation of a desired temperature distribution in a glass sheet.

The present invention has been made considering the above points, and it is an object of the present invention to provide a heating apparatus for glass sheet-bending and a bending method for a glass sheet, which can form a desired temperature distribution in a glass sheet even if a heat-shielding plate for forming a temperature distribution is present.

Means for Solving the Problems

The above object is achieved by a heating apparatus for glass-sheet-forming comprising a heating source for heating a glass sheet, a temperature-distributing heat shield for partitioning a heating region into a plurality of regions and partially shielding radiant heat rays radiated from the heating source toward the glass sheet so as to form a predetermined temperature distribution on a surface of the glass sheet heated by the heating source, wherein the heating apparatus for glass-sheet-forming further comprises a heat-ray-adjusting means for reducing radiant heat rays from the heating source reaching a portion of the surface of the glass sheet heated by the heating source that faces to the temperature-distributing heat shield.

Further, the above object is achieved by a bending method for a glass sheet, comprising placing a glass sheet on a frame-shaped bending mold, heating the glass sheet by radiant heat rays radiated from the heating source toward the glass sheet by the temperature-distributing heat shield partitioning a heating region into a plurality of regions so as to form a predetermined temperature distribution on the glass sheet, and bending the glass sheet by its own weight, wherein the bending method for a glass sheet further comprises a heat-ray-adjusting step of reducing radiant heat rays from the heating source reaching a portion of a surface of the glass sheet facing to the temperature-distributing heat shield, while the glass sheet is heated by the heating source.

In the invention of these embodiments, the heat-ray-adjusting means or the heat-ray-adjusting step reduces radiant heat rays from the heating source reaching a portion of the surface of the glass sheet heated by the heating source facing to the temperature-distributing heat shield. Without the treatment of the above heat-ray-adjusting means or the heat-ray-adjusting step, incidence of radiant heat rays from the heating source into a portion of the glass sheet facing to the temperature-distributing heat shield, that are incident both from the perpendicular direction and an oblique direction, are allowed. Accordingly, the radiant heat rays incident into the portion facing to the temperature-distributing heat shield is not significantly limited as compared with radiant heat rays incident into a surrounding portion of the glass sheet other than the portion facing to the temperature-distributing heat shield. On the other hand, with the above treatment by the heat-ray-adjusting means or the heat-ray-adjusting step, it is possible to reduce radiant heat rays incident into the portion of the glass sheet facing to the temperature-distributing heat shield to be equivalent to radiant heat rays incident into a surrounding portion other than the portion facing to the temperature-distributing heat shield. Accordingly, by the present invention, it is possible to prevent formation of a heater distortion in a portion of a glass sheet facing to the temperature-distributing heat shield, and it is possible to form a predetermined distribution on the glass sheet even if the heat shield for forming a temperature distribution is present. Accordingly, by the bending method for a glass sheet of the present invention, it is possible to prevent formation of a local high temperature in a glass sheet placed on a frame-shaped bending mold, and to realize forming of a glass sheet without forming a heater distortion.

In the above heating apparatus for forming a glass sheet, the construction may be such that the heat-ray adjusting means is a heat-ray-adjusting heat shield for partially shielding radiant heat rays radiated from the heating source towards a portion of the surface of the glass sheet facing to the temperature-distributing heat shield.

In the invention of this embodiment, reduction of radiant heat rays from a heating source reaching a portion of the surface of the glass sheet heated by the heating source facing to the temperature-distributing heat shield, is realized by a heat-ray-adjusting heat shield partially shielding radiant heat rays radiated from the heating source toward a portion of the surface of the glass sheet facing to the temperature-distributing heat shield. Accordingly, by the present invention, it is possible to prevent formation of a heater distortion on a portion of the glass sheet facing to the temperature-distributing heat shield, thereby to form a desired temperature distribution in the glass sheet even if the heat shield for forming a temperature distributing is present.

Further, in the above heating apparatus for forming a glass sheet, it is preferred that the size and the position of the heat-ray-adjusting heat shield are determined so that the effective area of the heating source for radiating radiant heat rays reaching a portion of the surface of the glass sheet heated by the heating source, that faces to the temperature-distributing heat shield, substantially equals to the effective area of the heating source radiating radiant heat rays reaching surrounding portions other than the portion facing to the temperature-distributing heat shield. More specifically, it is preferred that the former effective area substantially equals to the effective area of the heating source radiating radiant heat rays reaching a portion facing to the center of the region partitioned by the temperature-distributing heat shield.

Further, in the above bending method for a glass sheet, the method may be such that the heat-ray-adjusting step is a step of heating the glass sheet so that radiant heat rays from the heating source reaching a portion of the surface of the glass sheet facing to the temperature-distributing heat shield, substantially equals to radiant heat rays reaching a surrounding portion other than the portion facing to the temperature-distributing heat shield. More specifically, the method may be such that the glass sheet is heated so that the radiant heat rays from the heating source reaching a portion facing to the temperature-distributing heat shield, substantially equals to the radiant heat rays reaching a portion facing to the center of the region partitioned by the temperature-distributing heat shield.

In the invention of these embodiments, radiant heat rays incident in a portion of a glass sheet facing to the temperature-distributing heat shield, becomes equivalent to radiant heat rays incident into a surrounding portion other than the portion facing to the temperature-distributing heat shield, specifically, to a portion facing to the center of the region partitioned by the temperature-distributing heat shield. Accordingly, by the present invention, it is possible to prevent formation of a heater distortion in a portion of a glass sheet facing to the temperature-distributing heat shield, thereby to form a desired temperature distribution in the glass sheet even if the heat shield for forming a temperature distribution is present.

By the way, in the above heating apparatus for forming a glass sheet, the construction may be such that the temperature-distributing heat shield is disposed so as to be substantially vertical to the surface of the glass sheet heated by the heating source, and the heat-ray-adjusting heat shield is fixed to the temperature-distributing heat shield and disposed substantially in parallel with the surface of the glass sheet heated by the heating source.

In the invention of this embodiment, even if a temperature-distributing heat shield disposed substantially perpendicularly to a surface of a glass sheet is present, by the effect of a heat-ray-adjusting heat shield disposed substantially in parallel with the surface of the glass sheet, it is possible to prevent formation of a heater distortion in a portion of the glass sheet facing to the temperature-distributing heat shield, thereby to form a desired temperature distribution in the glass sheet.

Further, the construction may be such that the length L of the heat-ray-adjusting heat shield and the position H (distance from the leading edge of the temperature-distributing heat shield) of the heat-ray-adjusting heat shield satisfy the following formula provided that the distance from the heating source to the surface of the glass sheet is a, the width of the heating source is b, the length of the temperature-distributing heat shield is c, the thickness of the temperature-distributing heat shield is $t_1$ and the thickness of the heat-ray-adjusting heat shield is $t_2$:

$$L = \frac{b(b + 2t_1)(c - t_2)}{2\{2a(b + t_1) - bc\}}$$

$$H = \frac{b(a - c)(c - t_2)}{2a(b + t_1) - bc}$$

In the invention of this embodiment, it is possible to provide a heat-ray-adjusting heat shield having an appropriate size at an appropriate position, and it is possible to prevent formation of a heater distortion in a portion of a glass sheet facing to the temperature-distributing heat shield without reducing radiant heat rays incident into a portion facing to the center of the region partitioned by the temperature-distributing heat shield, thereby to form a desired temperature distribution in a glass sheet without excessively sacrificing the amount of heat.

Effects of the Invention

By the present invention, it is possible to prevent formation of a heater distortion in a portion of a glass sheet facing to a temperature-distributing heat shield, thereby to form a desired temperature distribution even if the heat shield for forming a temperature distribution is present.

EXPLANATION OF NUMERALS

| | |
|---|---|
| 10: | Heating apparatus for glass-sheet-forming (heating apparatus) |
| 12: | Heating furnace |
| 14: | Heating element |
| 20: | Heat-shielding plate |
| 22: | Heat shield |
| G: | Glass sheet |
| X: | Region |
| Y: | Heating region |
| Z2: | Forming zone |

BEST MODE FOR CARRYING OUT THE INVENTION

From now, specific embodiments of the heating apparatus for glass-sheet-forming and a bending method for a glass sheet according to the present invention, will be described with reference to drawings.

Figure 1:
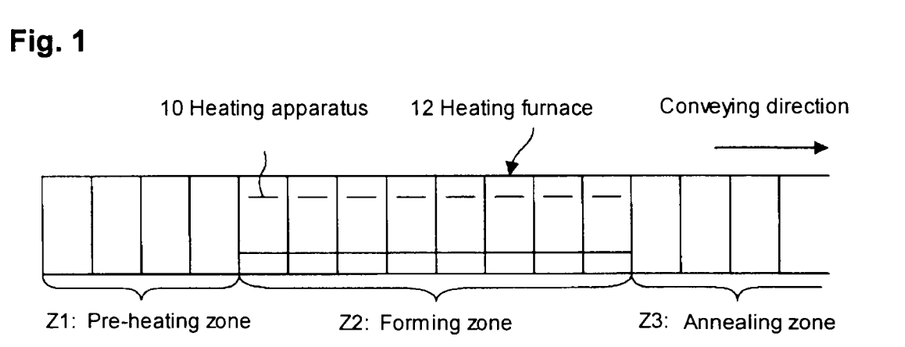
FIG. 1 is a general construction view of a heating furnace having a heating apparatus for glass-sheet-forming as an embodiment of the present invention.

FIG. 1 is a general construction view of a heating furnace 12 having a heating apparatus for glass-sheet-forming (hereinafter it is simply referred to as heating apparatus) as an example of the present invention. The heating furnace 12 of this example heats a glass sheet G to be employed for transportation vehicles such as automobiles or trains or for buildings, to bend the glass sheet G in (a) predetermined directions (for example, two directions that are a conveying direction and a perpendicular direction perpendicular to the conveying direction) by using the heating apparatus 10.

In this example, the heating furnace 12 has a tunnel-like shape constituted by a pre-heating zone Z1, a forming zone Z2 and an annealing zone Z3. The glass sheet G is conveyed through the pre-heating zone Z1, the forming zone Z2 and the annealing zone Z3 in this order by a conveyer. Here, conveyance of the glass sheet G is realized by conveyance of a bending mold (shown in FIG. 5) having a curved shape substantially agreeing with a desired bent shape of the glass sheet G, on which the glass sheet G is placed. Here, in FIG. 5, the glass sheet G has shape along the bending mold 16. However, this is just a schematic view, and the glass sheet G is actually gradually formed into the shape along the bending mold in the process of forming.

Each of the zones Z1, Z2 and Z3 has a plurality of sections arranged in the conveying direction (in FIG. 1, the pre-heating zone Z1 has four sections, the forming zone Z2 has eight sections and the annealing zone Z3 has four sections). Each of these sections has a size (area) accommodating a glass sheet G.

In each of the sections in the zones Z1, Z2 and Z3, a heating apparatus 10 for heating a glass sheet G is provided. The pre-heating zone Z1 is a zone wherein the heating temperature to be applied to the glass sheet G becomes higher as the glass sheet G progresses in the conveying direction; the forming zone Z2 is a zone wherein the heating temperature to be applied to the glass sheet G is constantly maintained; and the annealing zone Z3 is a zone wherein the heating temperature to be applied to the glass sheet G becomes lower as the glass sheet G progresses in the conveying direction. The heating apparatus 10 of each section is configured to be capable of controlling the heating amount independently.

The heating apparatus 10 has a ceiling heater 10a attached to the ceiling, a furnace floor heater 10b provided on a furnace floor, a side wall heater 10c provided on a side wall, etc. These heaters 10a, 10b and 10c are each constituted by a heating element held on a inner wall surface of the heating furnace 12 via a holding member, and the heating element has a function of heating the inside of the furnace. Further, particularly in a heating apparatus 10 in the forming zone Z2, the ceiling heater 10a or the furnace floor heater 10b each has a plurality of heating elements 14 disposed at positions substantially vertically above an upper face or below a lower face of a glass sheet G being conveyed horizontally. These heating elements 14 heat mainly a surface portion of the conveyed glass sheet G facing to (directly below or directly above) the heating elements 14.

Figure 2:
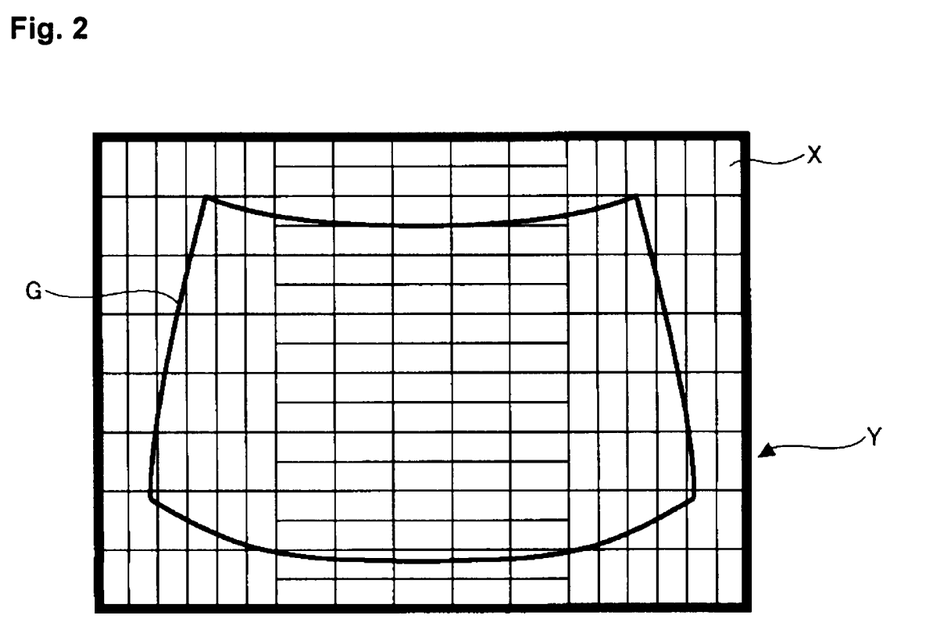
FIG. 2 is a view showing a heating region in one section in a forming zone heated by the heating apparatus for glass-sheet-forming of this example.
Figure 3:
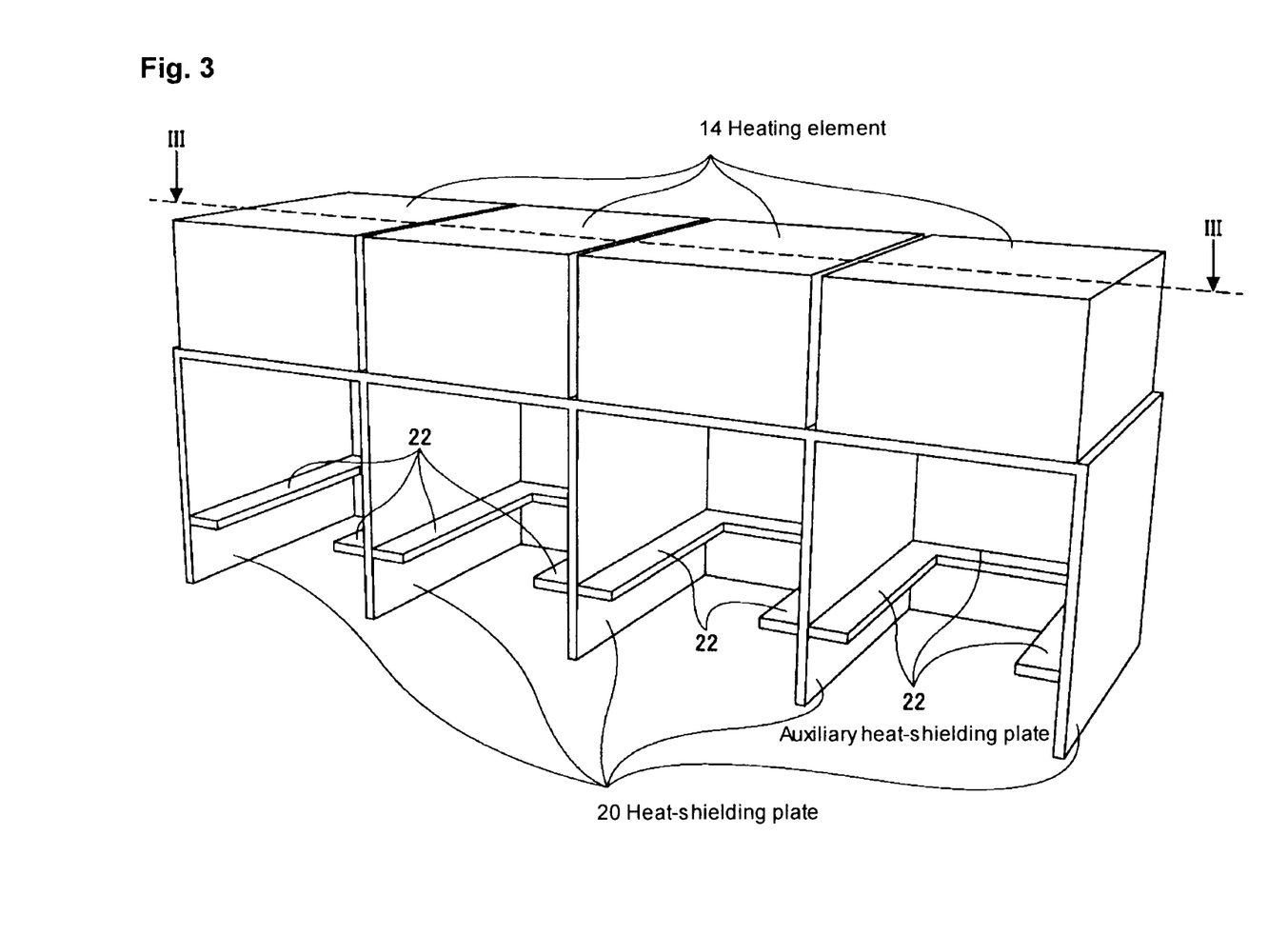
FIG. 3 is a perspective view of a main part of the heating apparatus for glass-sheet-forming of this example.
Figure 4:
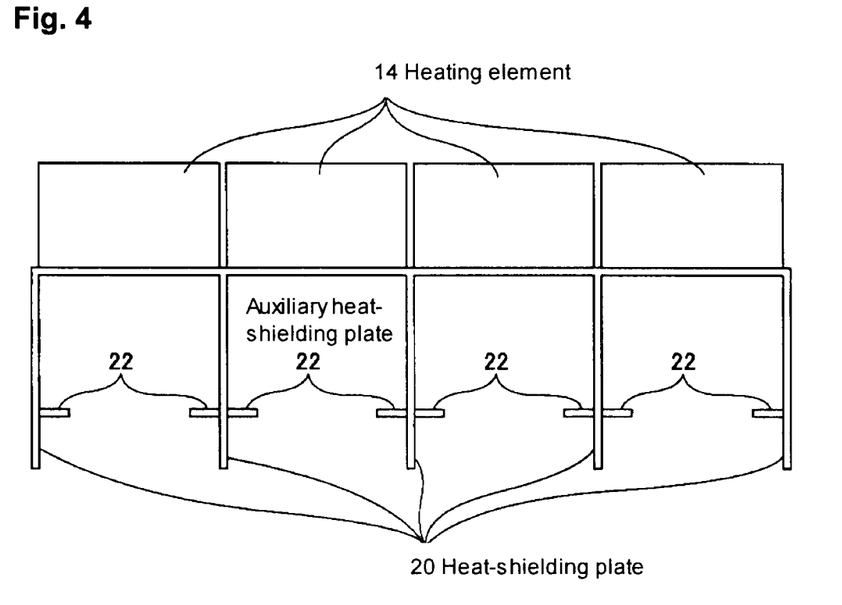
FIG. 4 is a cross-sectional view of a section III-III of the heating apparatus for glass-sheet-forming shown in FIG. 3.
Figure 5:
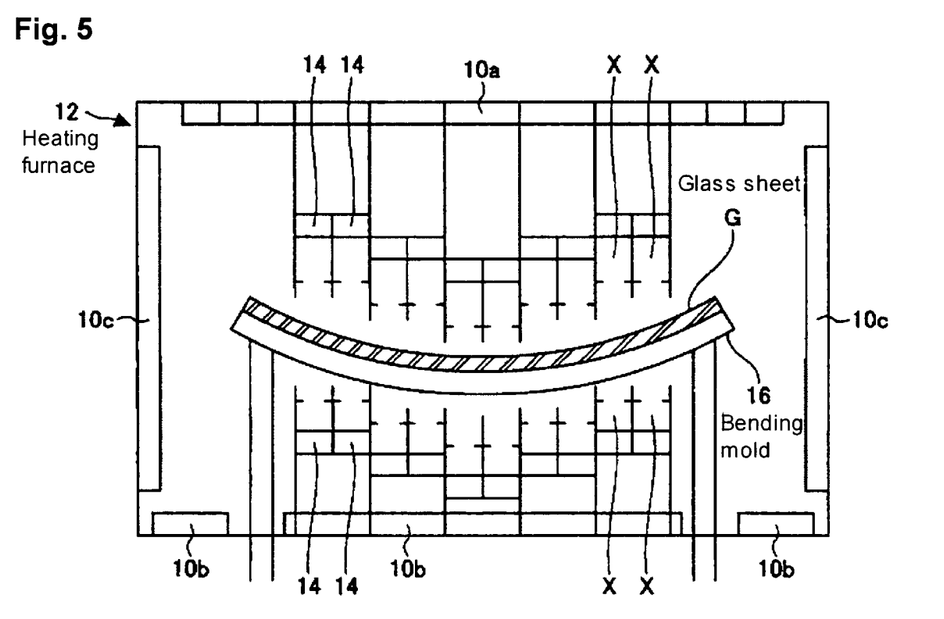
FIG. 5 is a construction view of a main part of the heating apparatus for glass-sheet-forming of this example.

FIG. 2 is a view showing a heating region Y in one section in the forming zone Z2 heated by the heating apparatus 10 of this example. Here, FIG. 2 shows the one section observed from an upper direction perpendicular to the conveying direction of the glass sheet G. FIG. 3 is a perspective view showing a main part of the heating apparatus 10 of this example. Further, FIG. 4 is a cross-sectional view showing a section III-III of the heating apparatus 10 shown in FIG. 3. Here, FIGS. 3 and 4 show a construction wherein a heating region Y of each section is partitioned into four arranged regions X. Further, FIG. 5 is a construction view of a main part of the heating apparatus 10 of this example. Here, FIG. 5 shows the heating apparatus 10 observed from the conveying direction when a glass sheet G to be bent is conveyed.

Each section in the forming zone Z2 has a heating region Y having a size (area) capable of accommodating a glass sheet G as shown in FIG. 2. The heating region Y of each section is partitioned into a plurality of (for example, about 200) regions X. In this heating region Y, the regions X are provided so as to be arranged in a matrix shape with a predetermined pattern when they are observed from a vertical direction. Each region X has, for example, a square or rectangular shape having a side length of about 50 to 200 mm. The pattern of the regions X in the heating region Y is determined so as to be capable of forming a desired temperature distribution in a glass sheet G. Further, the heating apparatus 10 of each section in the forming zone Z2, has heating elements 14 for each of the regions X in the heating region Y, and each of the heating elements is configured to be capable of controlling the heating amount independently.

The heating apparatus 10 of each section in the forming zone Z2 has a heat-shielding plate 20 for partitioning a single heating region Y into a plurality of regions X. The heat-shielding plate 20 is, for example, made of a glass fiber, a stainless steel or a carbon cloth, and is attached to an inner wall face (ceiling or furnace floor) of the heating furnace 12 via a holding member. The heat-shielding plate 20 extends substantially vertically downward or upward with respect to a ceiling or a furnace floor, that is, with respect to a horizontal plane on which a glass sheet G to be heated by the heating element 14 is placed, and the heat-shielding plate 20 is arranged in a matrix shape when it is observed from a vertical direction so that the heating region Y is partitioned into a plurality of regions X arranged in a matrix shape.

The heat-shielding plate 20 attached to the inner wall face of the heating furnace 12 extends from the inner wall face towards a conveying plane of a glass sheet G, and has a predetermined length (for example, 100 mm) in the vertical direction. Further, an end (lower end or upper end) of the heat-shielding plate 20 opposite to an end of the plate attached to the inner wall face, is positioned so that the distance to the surface of the glass sheet G becomes a predetermined distance (for example, 100 mm) in the vertical direction at any position in the entire glass sheet. The heat-shielding plate 20 has a function of partially shielding radiant heat rays (mainly radiant heat rays radiated in an oblique direction) radiated from a heating element 14 of the ceiling or the furnace floor.

In the heating apparatus 10 having such a heat-shielding plate 20, in radiant heat rays radiated from a heating element 14 of the ceiling or the furnace floor, radiant heat rays incident from an oblique direction to a surface of a glass sheet G is shielded by the heat-shielding plate 20. Accordingly, incidence of radiant heat rays radiated from a heating element 14 of a region X into adjacent regions X, is suppressed. Further, in the heating region Y, the heat amount for each region X can be independently controlled. Accordingly, in this example, since it is possible to control the temperature distribution in the heating region Y in the forming zone Z2 by precisely controlling the temperature of each region X, it is possible to impart a desired temperature distribution to a glass sheet, and to form the border of the temperature distribution sharply.

Heating elements 14 of respective regions X are disposed at respective vertical positions in accordance with the bent shape of a conveyed glass sheet G. Namely, the distance between a surface of the glass sheet G and heating elements 14 of respective regions X are substantially constant over the entire surface of the glass sheet G to be bent. When the glass sheet G conveyed is a flat glass sheet, heating element 14 of the respective regions X are arranged at the same vertical position so that they are arranged in a horizontal direction. On the other hand, as shown in FIG. 5, when a conveyed glass sheet G is a curved glass sheet, heating elements 14 of the respective regions X are arranged at different vertical positions in accordance with the curved shape of the glass sheet G.

Here, when a curved glass sheet G is conveyed, it is preferred that in a heating region Y of each section of the heating furnace 12, an elevating device (not shown) is provided for every region X or for every predetermined number of the regions X, and the heating element 14 for each region is movable up and down according to an operation of each elevating means instructed by a controller, while each heating element 14 is held by an inner wall face of the heating furnace 12. In this case, the controller outputs instructions to elevating devices to move up and down the respective heating elements 14 appropriately in accordance with a curved shape of the glass sheet G. By the above construction and process control, by moving up and down heating elements 14 of the respective areas X in accordance with the curved shape of a conveyed glass sheet G, even if the curved shape is changed, it is possible to maintain the distance between the heating elements 14 of respective regions X to the surface of the glass sheet G constant, whereby it becomes easy to impart a desired temperature distribution to the glass sheet G. Here, in this case, it is preferred that the heat-shielding plate 20 is also moved up and down with respect to an inner wall face while the heat-shielding plate 20 is held by the inner wall face (ceiling or furnace floor) in accordance with the up-down movement of the heating element 14.

Here, each heating element 14 is not necessarily move up and down in accordance with the change of the curved shape, and the construction may be such that the position is fixed during the forming and the positions of the heating elements 14 of each section can be optionally changed during off line. By such a construction, it is possible to easily rearrange the heating elements 14 for preparation of forming of glass sheets having a different shape.

Further, when glass sheets are being conveyed continuously, the construction is preferably such that all of the heating elements 14 above or below the glass sheets or in e.g. the entire heating region Y are connected to a single rack or both of those above and below the glass sheets are connected to respective racks, so that the heating elements are movable up and down at the same time. By such a construction, when a glass sheet is conveyed into each of the sections, it is possible to quickly widen the distance between upper and lower heat-shielding plates, thereby to facilitate, conveyance of the glass sheet into the section.

In the above construction of this example, each of the glass sheets G cut into a predetermined shape is placed on a bending mold 16, or a plurality of them are piled on the bending mold 16, and they are conveyed into the heating furnace 12. The glass sheets G conveyed into the heating furnace 12, are thereafter, intermittently conveyed so that they stop at each section. Then, each of the glass sheets G is heated at about 500° C. in a pre-heating zone Z1, and thereafter, while it stops in a predetermined section in the forming zone Z2, it is heated so as to form a desired temperature distribution. When such a temperature distribution is formed in the glass sheet G, the glass sheet G is bent along the bending mold 16 by its own weight (gravity) to be formed into a desired shape. Then, the glass sheet G formed into a desired shape is, thereafter, gradually cooled in the annealing zone Z3.

Figure 6:
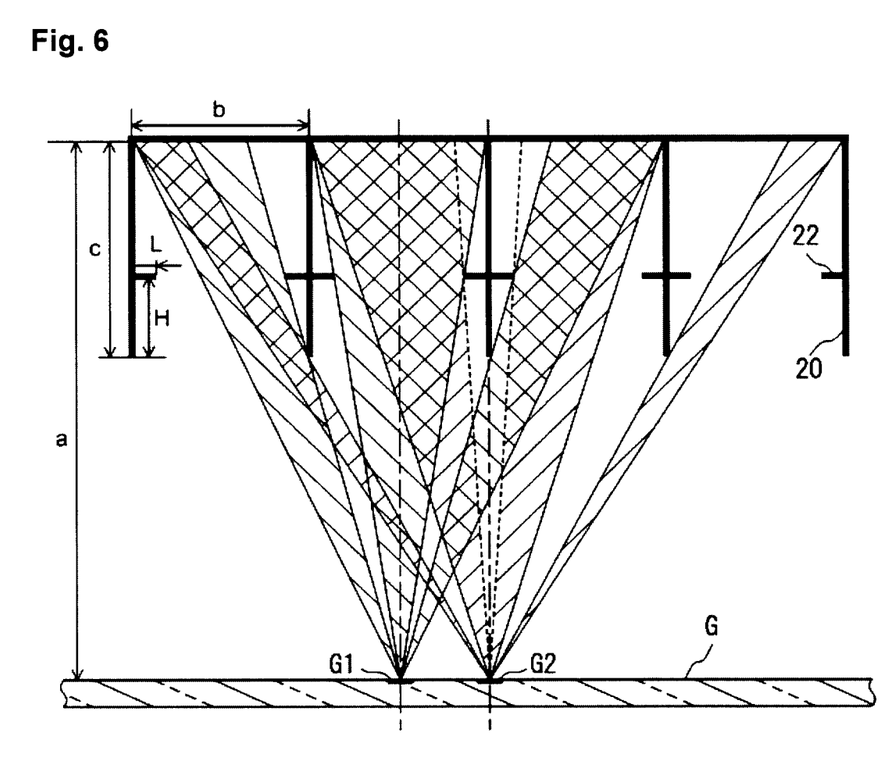
FIG. 6 is a view schematically showing radiant heat rays radiated from a heating source in the heating apparatus for glass-sheet-forming of this example.
Figures 7A, 7B:
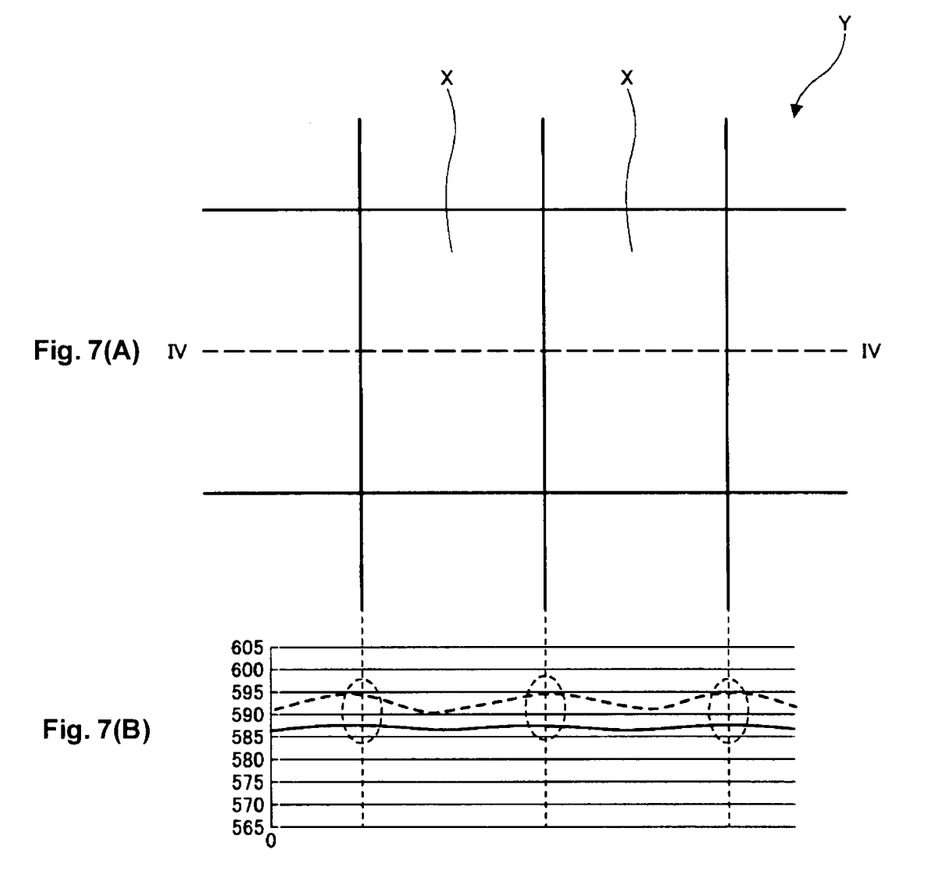
FIGS. 7(A) and 7(B) are views for explaining the effect of the heating apparatus for glass-sheet-forming of this example.

FIG. 6 is a view schematically showing radiant heat rays radiated from heating elements 14 in the heating apparatus 10 of this example. Further, FIGS. 7(A) and 7(B) are views for explaining the effect of the heating apparatus 10 of this example. Here, FIG. 7(A) is a view showing a part of a heating region Y observed from a plane direction, and FIG. 7(B) is a view showing temperature distributions along a line IV-IV of the heating region Y shown in FIG. 7(A) when an auxiliary heat-shielding plate 22 to be described later is present (solid line) and when it is absent (broken line) for comparison.

By the way, in this example, each heating apparatus 10 of each section of the forming zone Z2 has an auxiliary heat-shielding plate 22. The auxiliary heat-shielding plate 22 is made of, for example, a glass fiber, a stainless steel or a carbon cloth in the same manner as the heat-shielding plate 20. The auxiliary heat-shielding plate 22 is integrally attached and fixed to a heat-shielding plate 20 for each region X in the heating region Y, having a square cross section each enclosed by four walls of the heat-shielding plate 20, so that the auxiliary heat-shielding plate 22 is attached to the entire inner periphery of the heat-shielding plate 20, so that a portion of a space inside the region X, for example, a horizontal cross-sectional area at a predetermined vertical position, is narrowed. The auxiliary heat-shielding plate 22 is provided so as to extend from the inner wall face of the heat-shielding plate 20 in a direction perpendicular to the heat-shielding plate 20, and the auxiliary heat-shielding plate 22 is provided so as to be substantially parallel with a ceiling or a furnace floor of the heating furnace, that is, with a horizontal plane on which a glass sheet G to be heated by the heating elements 14 is placed.

Here, attachment of the auxiliary heat-shielding plate 22 to the heat-shielding plate 20 is not necessarily made to the entire inner periphery of the heat-shielding plate 20 so long as the presence of the auxiliary heat-shielding plate 22 can reduce the total radiant heat rays from the heating elements 14 reaching a portion of the glass sheet G facing to the heat-shielding plate 20, so that the total radiant heat rays reaching the portion substantially equals to the total radiant heat rays reaching its surrounding portion. Namely, the auxiliary heat-shielding plate 22 may be provided only on one side of each region X or only on a part of it.

The size of the auxiliary heat-shielding plate 22 and its disposed position in relation to the heat-shielding plate 20 of each region X, are determined so that the effective area of the heating elements 14 radiating radiant heat rays reaching a portion facing to (directly under or directly above) the heat-shielding plate 20 (a portion where the heat-shielding plate 20 crosses when it is imaginarily extended in the upper or lower direction; hereinafter it is referred to as a portion facing to the heat-shielding plate 20) on the surface of the glass sheet G heated by the heating elements 14, substantially equals to the effective area of the heating elements 14 radiating radiant heat rays reaching a surrounding portion (central portion) other than the portion facing to the heat-shielding plate 20. The size of the auxiliary heat-shielding plate 22 and its disposed position in relation to the heat-shielding plate 20 of each region X, change depending on the distance between opposed inner walls of the heat-shielding plate 20 or the distance to the glass sheet G.

For example, in order to make the effective area of the heating elements 14 radiating radiant heat rays reaching a central portion G1 of the glass sheet that faces to the center between the heat-shielding plates 20 equal to the effective area of the heating elements 14 radiating radiant heat rays reaching a portion G2 of the glass sheet facing to the heat-shielding plate 20, the length L of the auxiliary heat-shielding plate 22 in the horizontal direction and the distance H from the leading edge of the heat-shielding plate 20, are obtained by the following formulae provided that the distance between a heating element 14 and the surface of the glass sheet G is a, the width of the heating element 14 is b and the length of the heat-shielding plate 20 is c.

$$L = \frac{bc}{2(2a-c)}$$

$$H = \frac{c(a-c)}{2a-c}$$

In this case, when the distance a between the heating element 14 and the surface of the glass sheet G in the vertical direction is 250 mm, the width b of the heating element is 100 mm, and the length c of the heat-shielding plate 20 in the vertical direction is 100 mm, then, the length L of the auxiliary heat-shielding plate 22 in the horizontal direction that is attached to each heat-shielding plate 20, becomes about 12.5 mm, and the position of the auxiliary heat-shielding plate 22 becomes a position of about 37.5 mm from the lower end or the upper end of the heat-shielding plate 20. Here, the L and the H obtained above may be approximate values in a degree that they do not deteriorate the effect of the present invention.

Figure 9:
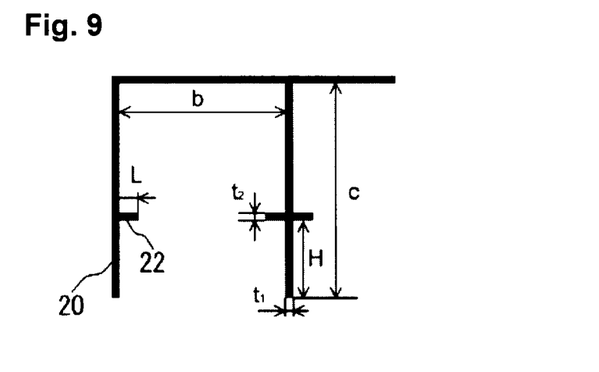
FIG. 9 is a view for explaining the size and the position of an auxiliary heat-shielding plate of this example.

Further, when the thickness $t_1$ of the heat-shielding plate 20 and the thickness $t_2$ of the auxiliary heat-shielding plate 22 needs to be considered, H and L are obtained by the following formulae. Here, the meanings of the symbols are as shown in FIG. 9.

$$L = \frac{b(b+2t_1)(c-t_2)}{2\{2a(b+t_1)-bc\}}$$

$$H = \frac{b(a-c)(c-t_2)}{2a(b+t_1)-bc}$$

The auxiliary heat-shielding plate 22 has a function of partially shielding radiant heat rays radiated from a heating element 14 toward a portion facing to the heat-shielding plate 20 in the surface of a glass sheet G heated by the heating element 14, thereby to reduce the radiant heat rays from the heating element 14 reaching the portion facing to the heat-shielding plate 20. Specifically, the auxiliary heat-shielding plate 22 has a function of limiting radiant heat rays from a heating element 14 located right above or right below a portion facing to the heat-shielding plate 20 in the surface of a glass sheet G, and allowing incidence of radiant heat rays from a heating element 14 located at a predetermined oblique position.

If the heating apparatus 10 does not have such an auxiliary heat-shielding plate 22 and has only the heat-shielding plate 20, the effective area of the heating elements 14 radiating radiant heat rays incident into a portion of the glass sheet G, that faces to the heat-shielding plate 20, becomes excessively large, which may cause a heater distortion in the portion of the glass sheet G, that faces to the heat-shielding plate 20, due to the presence of the heat-shielding plate 20 (refer to the temperature distribution represented by the broken lines in FIG. 7(B); in particular, the region encompassed by the dotted lines).

On the other hand, in the heating apparatus 10 having the above auxiliary heat-shielding plate 22, radiant heat rays from the heating elements 14 incident into a portion other than the portion G2 facing to the heat-shielding plate 20 (central portion G1) in the surface of the glass sheet G, is not susceptible to the presence or absence of the auxiliary heat-shielding plate 22. Meanwhile, radiant heat rays from the heating elements 14 incident into the portion G2 facing to the heat-shielding plate 20 in the area of the glass sheet G is reduced as compared with an apparatus which does not have the auxiliary heat-shielding plate 22. Accordingly, it is possible to make the radiant heat rays incident into the portion G2 facing to the heat-shielding plate 20 equivalent to radiant heat rays incident into a central portion G1 other than the portion G2. Namely, it is possible to make the effective area of the heating elements 14 radiating radiant heat rays incident into the portion G2 facing to the heat-shielding plate 20 in the glass sheet G, substantially equal to the effective area of the heating elements 14 radiating radiant heat rays incident into the central portion G1 other than the portion G2 facing to the heat-shielding plate 20.

Accordingly, by the heating apparatus 10 of this example, it is possible to prevent formation of a heater distortion in the vicinity of the portion G2 of a glass sheet G facing to the heat-shielding plate 20 due to the presence of the heat-shielding plate 20 for forming a temperature distribution in the glass sheet G. Accordingly, by the heating apparatus 10 of this example, even if the heat-shielding plate 20 for forming a temperature distribution in the glass sheet G is present, it is possible to form a desired temperature distribution in the glass sheet G by the presence of an auxiliary heat-shielding plate 22 attached to the heat-shielding plate 20, and as a result, it is possible to form the glass sheet G into a desired shape.

Here, in the above example, the heating element 14 corresponds to the "heating source" described in Claims, the heat-shielding plate 20 corresponds to the "temperature-distributing heat shield" described in Claims, and the auxiliary heat-shielding plate 22 corresponds to "heat-ray-adjusting means" and "heat-ray-adjusting heat shield" described in Claims.

Figure 8:
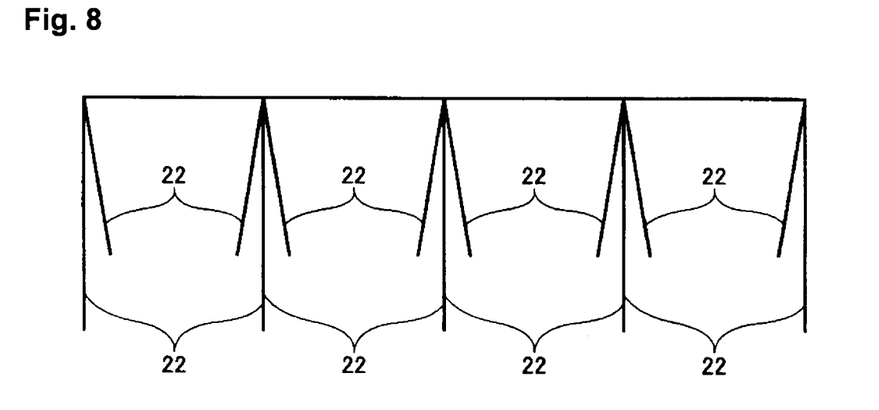
FIG. 8 is a cross-sectional view of a main part of a heating apparatus for glass-sheet-forming according to a modified example of the present invention.

By the way, in the above example, the auxiliary heat-shielding plate 22 for partially shielding radiant heat rays radiated from the heating elements 14 toward a portion of the surface of a glass sheet G to be heated, that faces to the heat-shielding plate 20, is attached to the heat-shielding plate 20 so that the auxiliary heat-shielding plate 22 extends from the inner wall face of the heat-shielding plate 20 in a direction perpendicular to the heat-shielding plate 20 and so that it extends substantially in parallel with the surface of a glass sheet G heated by the heating elements 14. However, the shape of the auxiliary heat-shielding plate 22 is not limited to the above shape. So long as the effective area of the heating elements 14 radiating radiant heat rays reaching a portion of the surface of a glass sheet heated by the heating elements 14, that faces to the heat-shielding plate 20 (directly under or directly above the heat-shielding plate 20), substantially equals to the effective area of the heating elements 14 radiating radiant heat rays reaching a surrounding portion other than the portion facing to the heat-shielding plate 20, the shape of the auxiliary heat-shielding plate 22 may be such that it is attached to a foot of the heat-shielding plate 20 and extends in an oblique direction. FIG. 8 shows a cross-sectional view of the main part of the heating apparatus 10 having such an auxiliary heat-shielding plate 22. In such a modified example, it is possible to reduce radiant heat rays from the heating element 14 incident into a portion G2 in the surface of the glass sheet G facing to the heat-shielding plate 20, thereby to prevent formation of a heater distortion in the vicinity of the portion G2 of the glass sheet G facing to the heat-shielding plate 20.

Further, in the above example, in order to reduce radiant heat rays from the heating elements 14 reaching a portion of the surface of a glass sheet G to be heated, that faces to the heat-shielding plate 20, an auxiliary heat-shielding plate 22 is provided for partially shielding radiant heat rays from the heating elements 14 toward the portion facing to the heat-shielding plate 20. However, the present invention is not limited thereto, and it is sufficient that a heat-ray-adjusting means is provided, which is capable of reducing radiant heat rays from the heating elements 14 reaching a portion of the surface of the glass sheet G facing to the heat-shielding plate 20 without reducing radiant heat rays from the heating elements 14 reaching portions other than the portion facing to the heat-shielding plate 20.

Figure 10:
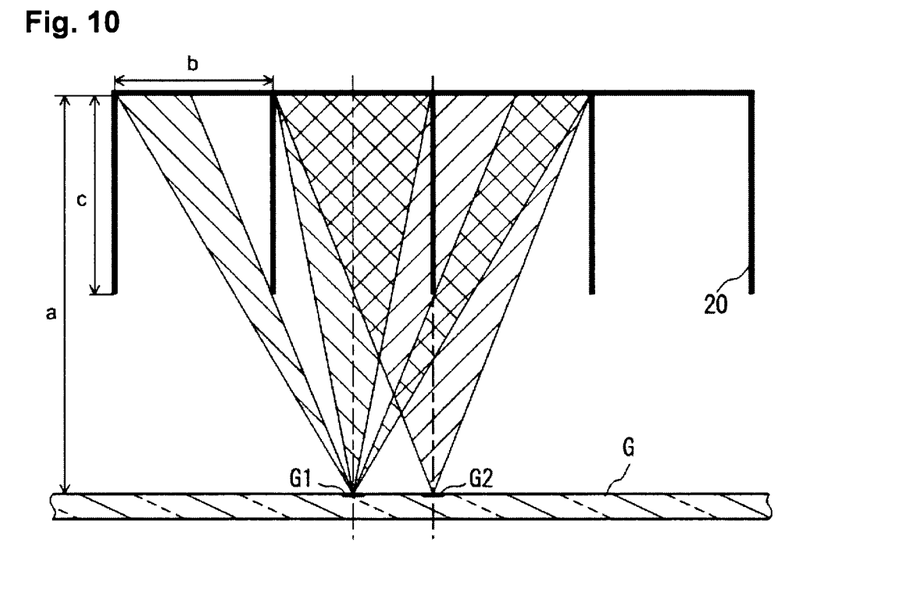
FIG. 10 is a view for explaining a heating apparatus for glass-sheet-forming according to a modified example of the present invention.

Such an example may be as follows. As shown in FIG. 10, the distance a between a heating element 14 and the surface of the glass sheet G, is a positive integer times of the length c of the heat-shielding plate 20, respective radiant heat rays incident into the central portion G1 and the portion G2 facing to the heat-shielding plate 20, are substantially equal even with no auxiliary heat-shielding plate 22. However, this is a case where only one direction is considered. When lengths of the heat-shielding plate 20 constituting an area X in perpendicular directions are different from each other as shown in FIG. 7(A), respective radiant heat rays incident from the other direction into the central portion G1 and the portion G2 facing to the heat-shielding plate 20 are different from each other, and accordingly, the auxiliary heat-shielding plate 22 of the present invention is necessary.

Namely, as a means for adjusting heat rays, by making the area X partitioned by the heat-ray-shielding plate 20 be square in plan view and making the distance a between a heating element 14 and the surface of the glass sheet G be a positive integer times of the length c of the heat-shielding plate 20, then, it is possible to make radiant heat rays incident into the central portion G1 be substantially equal to those incident into the portion G2 facing to the heat-shielding plate 20, thereby to solve the problem of the present invention.

INDUSTRIAL APPLICABILITY

The present invention is suitable for heating a glass sheet to have a strict temperature distribution and to bend the glass sheet, and is applicable for production of glass sheets to be used for transportation devices such as automobiles or trains, or buildings.

What is claimed is:

1. A method for bending a glass sheet, the method comprising:
   placing a glass sheet on a frame-shaped bending mold;
   heating the glass sheet by radiant heat rays radiated from a heating source towards the glass sheet, such that the radiant heat rays are partially shielded by at least one temperature-distributing heat shield that partitions a heating region into a plurality of heat regions so as to form a predetermined temperature distribution on the glass sheet, wherein the temperature-distributing heat shield is attached to an inner wall face of a heating furnace;
   reducing radiant heat rays from the heating source reaching at least one adjacent portion of a surface of the glass sheet, said adjacent portion facing the temperature-distributing heat shield; and
   bending the glass sheet by its own weight,
   wherein:
   the reducing radiant heat rays comprises adjusting the radiant heat rays with at least one heat-ray-adjusting heat shield fixed to the at least one temperature-distributing heat shield;
   the heat-ray-adjusting heat shield is situated such that a plane of the heat-ray-adjusting heat shield is substantially parallel to a surface of the glass sheet; and
   a length L of the heat-ray-adjusting heat shield and a position H, corresponding to a distance from a leading edge of the temperature-distributing heat shield, of the heat-ray-adjusting heat shield satisfy the formulas:

$$L = \frac{b(b + 2t_1)(c - t_2)}{2\{2a(b + t_1) - bc\}}$$

$$H = \frac{b(a - c)(c - t_2)}{2a(b + t_1) - bc}.$$

wherein:
"a" is a distance from the heating source to a surface of the glass sheet;
"b" is a width of the heating source;
"c" is a length of the temperature-distributing heat shield;
"$t_1$" is a thickness of the temperature-distributing heat shield; and
"$t_2$" is a thickness of the heat-ray-adjusting heat shield.

2. The method of claim 1, wherein the reducing radiant heat rays is such that radiant heat rays from the heating source reaching the adjacent portion of the surface of the glass sheet, which faces the temperature-distributing heat shield, substantially equal radiant heat rays reaching a surrounding portion other than the adjacent portion.

3. The method of claim 2, wherein:
a heat region partitioned by the temperature-distributing heat shield is square in shape, as viewed from a side such that a plane of the temperature-distributing heat shield forms a side of the square shape; and a distance from the heating source to a surface of the glass sheet is a positive integer times a length of the temperature-distributing heat shield, said distance corresponding to a perpendicular line between the heating source and the surface of the glass sheet.

4. The method of claim 1, wherein the reducing radiant heat rays is such that the radiant heat rays from the heating source reaching the adjacent portion of the surface of the glass sheet facing the temperature-distributing heat shield substantially equal radiant heat rays reaching a central portion in the center of a heat region partitioned by the temperature-distributing heat shield.

5. The method of claim 4, wherein:
a heat region partitioned by the temperature-distributing heat shield is square in shape, as viewed from a side such that a plane of the temperature-distributing heat shield forms a side of the square shape; and
a distance from the heating source to a surface of the glass sheet is a positive integer times a length of the temperature-distributing heat shield, said distance corresponding to a perpendicular line between the heating source and the surface of the glass sheet.

6. The method of claim 1, wherein:
a heat region partitioned by the temperature-distributing heat shield is square in shape, as viewed from a side such that a plane of the temperature-distributing heat shield forms a side of the square shape; and
a distance from the heating source to a surface of the glass sheet is a positive integer times a length of the temperature-distributing heat shield, said distance corresponding to a perpendicular line between the heating source and the surface of the glass sheet.

7. The method of claim 1, comprising heating the glass sheet with radiant heat rays radiated towards the glass sheet from the heating source, which is situated in the heating furnace, while the bending mold is conveyed in a predetermined direction.

8. The method of claim 7, wherein:
the heating furnace has a tunnel-like shape and comprises a plurality of heating sections arranged in a conveying direction;
each heating section comprises a heating source attached to a ceiling; and
the heating source is partitioned into a plurality of heating regions configured to control a heating amount.

9. The method of claim 8, wherein the bending mold is conveyed such that the glass sheet stops at each heating section.

10. The method of claim 1, wherein:
the radiant heat rays are partially shielded by more than one temperature-distributing heat shield;
a length of each of the more than one temperature-distributing heat shield is the same; and
a distance from the heating source to a surface of glass sheet is a positive integer times the length of each of the more than one temperature-distributing heat shield, said distance corresponding to a perpendicular line between the heating source and the surface of the glass sheet.

11. A method for bending a glass sheet, the method comprising:
placing a glass sheet on a frame-shaped bending mold;
heating the glass sheet with a heating apparatus so as to form a predetermined temperature distribution in the glass sheet; and
bending the glass sheet by its own weight,
wherein the heating apparatus comprises:
a heating source for heating a glass sheet;
a temperature-distributing heat shield for partitioning a heating region into a plurality of heat regions and partially shielding radiant heat rays radiated from the heating source toward the glass sheet so as to form a predetermined temperature distribution on a surface of the glass sheet heated by the heating source, wherein the temperature-distributing heat shield is attached to an inner wall face of a heating furnace; and
a heat-ray-adjusting heat shield configured to reduce radiant heat rays from the heating source reaching an adjacent portion of the surface of the glass sheet heated by the heating source, said adjacent portion facing the temperature-distributing heat shield, such that the heat-ray-adjusting heat shield is fixed to the temperature-distributing heat shield.

12. The method of claim 11, further comprising reducing radiant heat rays with the heat-ray adjusting heat shield such that radiant heat rays from the heating source reaching the adjacent portion of the surface of the glass sheet, which faces the temperature-distributing heat shield, substantially equal radiant heat rays reaching a surrounding portion other than the adjacent portion.

13. The method of claim 12, wherein:
a heat region partitioned by the temperature-distributing heat shield is square or rectangular in shape, as viewed from a side such that a plane of the temperature-distributing heat shield forms a side of the square shape; and
a distance from the heating source to a surface of the glass sheet is a positive integer times a length of the temperature-distributing heat shield, said distance corresponding to a perpendicular line between the heating source and the surface of the glass sheet.

14. The method of claim 11, further comprising reducing radiant heat rays with the heat-ray adjusting heat shield such that the radiant heat rays from the heating source reaching the adjacent portion of the surface of the glass sheet facing the temperature-distributing heat shield substantially equal radiant heat rays reaching a central portion in the center of a heat region partitioned by the temperature-distributing heat shield.

15. The method of claim 11, wherein:
a heat region partitioned by the temperature-distributing heat shield is square or rectangular in shape, as viewed from a side such that a plane of the temperature-distributing heat shield forms a side of the square shape; and
a distance from the heating source to a surface of the glass sheet is a positive integer times a length of the temperature-distributing heat shield, said distance corresponding to a perpendicular line between the heating source and the surface of the glass sheet.

16. The method of claim 11, comprising heating the glass sheet with radiant heat rays radiated towards the glass sheet from the heating source, which is situated in the heating furnace, while the bending mold is conveyed in a predetermined direction.

17. The method of claim 16, wherein:
the heating furnace has a tunnel-like shape and comprises a plurality of heating sections arranged in a conveying direction;
each heating section comprises a heating source attached to a ceiling; and
the heating source is partitioned into a plurality of heating regions configured to control a heating amount.

18. The method of claim 17, wherein the bending mold is conveyed such that the glass sheet stops at each heating section.

19. A method for bending a glass sheet, the method comprising:

placing a glass sheet on a frame-shaped bending mold;

heating the glass sheet by radiant heat rays radiated from a heating source towards the glass sheet, such that the radiant heat rays are partially shielded by at least one temperature-distributing heat shield that partitions a heating region into a plurality of heat regions so as to form a predetermined temperature distribution on the glass sheet, wherein the temperature-distributing heat shield is attached to an inner wall face of a heating furnace;

reducing radiant heat rays from the heating source reaching at least one adjacent portion of a surface of the glass sheet, said adjacent portion facing the temperature-distributing heat shield; and bending the glass sheet by its own weight, wherein:

the reducing radiant heat rays is such that radiant heat rays from the heating source reaching the adjacent portion of the surface of the glass sheet, which faces the temperature-distributing heat shield, substantially equal radiant heat rays reaching a surrounding portion other than the adjacent portion; and the reducing radiant heat rays comprises adjusting the radiant heat rays with at least one heat-ray-adjusting heat shield fixed to the at least one temperature-distributing heat shield.

* * * * *